United States Patent
Desrosiers et al.

(10) Patent No.: US 9,871,386 B2
(45) Date of Patent: Jan. 16, 2018

(54) WIRELESS COMMUNICATION DEVICE AND POWER RECEIVING UNIT WITH SWITCHING PREDICTION AND METHODS FOR USE THEREWITH

(71) Applicant: BROADCOM CORPORATION, Irvine, CA (US)

(72) Inventors: Ryan Michael Desrosiers, Fort Collins, CO (US); Mark David Rutherford, Wellington, CO (US); John Stuart Walley, Ladera Ranch, CA (US); Vadim Bishtein, Sunnyvale, CA (US); Angel Arturo Polo, Solana Beach, CA (US)

(73) Assignee: AVAGO TECHNOLOGIES GENERAL IP (SINGAPORE) PTE. LTD, Singapore (SG)

( * ) Notice: Subject to any disclaimer, the term of this patent is extended or adjusted under 35 U.S.C. 154(b) by 235 days.

(21) Appl. No.: 14/954,095

(22) Filed: Nov. 30, 2015

(65) Prior Publication Data

US 2017/0126021 A1    May 4, 2017

Related U.S. Application Data

(60) Provisional application No. 62/248,778, filed on Oct. 30, 2015.

(51) Int. Cl.
*H02J 5/00*    (2016.01)

(52) U.S. Cl.
CPC .................................. *H02J 5/005* (2013.01)

(58) Field of Classification Search
CPC ...................................................... H02J 5/005
USPC ....................................................... 307/104
See application file for complete search history.

(56) References Cited

U.S. PATENT DOCUMENTS

2015/0049529 A1*    2/2015   Iorio .................. H02M 3/33507
                                                                    363/89

* cited by examiner

*Primary Examiner* — Robert Deberadinis
(74) *Attorney, Agent, or Firm* — Garlick & Markison; Bruce E. Stuckman

(57) ABSTRACT

Aspects of the subject disclosure may include, for example, a power receiving unit having a wireless power receiver configured to receive a wireless power signal from a power transmitting unit. A rectifier includes a plurality of switching circuits configured to generate a rectified voltage from the wireless power signal, based on switch control signals that include a switch-on signal and a switch-off signal for corresponding ones of the plurality of switching circuits. A rectifier control circuit generates the switch control signals based on predicted switching delays. Other embodiments are disclosed.

20 Claims, 9 Drawing Sheets

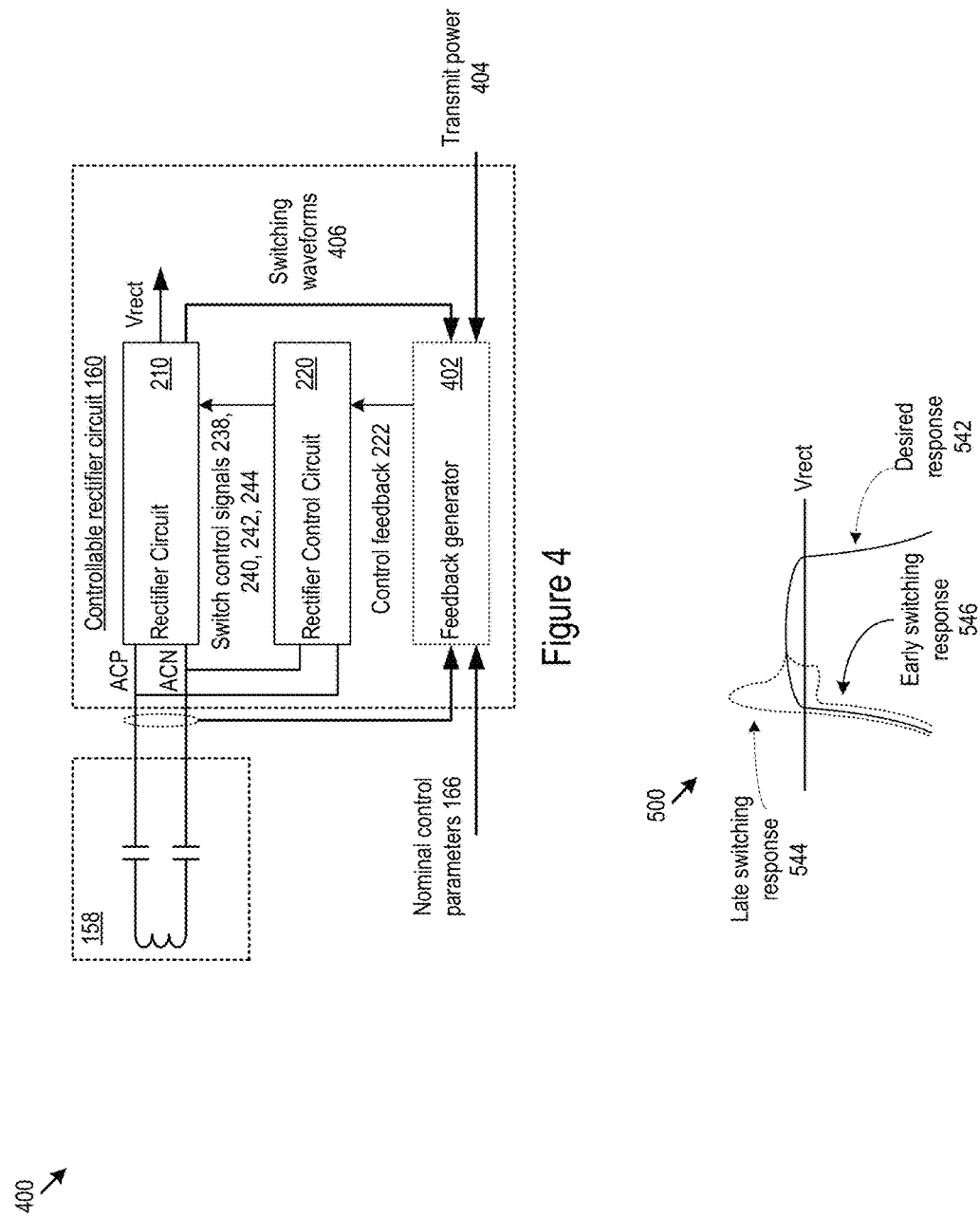

US 9,871,386 B2

WIRELESS COMMUNICATION DEVICE AND POWER RECEIVING UNIT WITH SWITCHING PREDICTION AND METHODS FOR USE THEREWITH

CROSS-REFERENCE TO RELATED APPLICATIONS

The present U.S. Utility patent application claims priority pursuant to 35 U.S.C. §119(e) to U.S. Provisional Application No. 62/248,778, entitled, "WIRELESS COMMUNICATION DEVICE AND POWER RECEIVING UNIT WITH SWITCHING PREDICTION AND METHODS FOR USE THEREWITH," filed on Oct. 30, 2015, which is hereby incorporated herein by reference in its entirety and made part of the present U.S. Utility patent application for all purposes.

BACKGROUND

Technical Field

Various embodiments relate generally to wireless communication systems, wireless power systems, and also to wireless charging of devices.

Description of Related Art

Communication systems are known to support wireless and wireline communications between wireless and/or wireline communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, Bluetooth Low Energy (BLE), advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

The Alliance for Wireless Power (A4WP) has promulgated a baseline systems specification for interoperability of loosely coupled wireless power transfer for portable, hand-held electronic devices. This specification supports a 6.78 MHz for power transfers and a 2.4 GHz operating frequency for management data transfers. The Wireless Power Consortium (WPC) has also promulgated standards used for wireless charging of mobile devices, notably the Qi low power specification.

BRIEF DESCRIPTION OF THE SEVERAL VIEWS OF THE DRAWINGS

FIG. 4 is a schematic block diagram of an embodiment of components of a wireless charging system;

FIG. 5 is a graphical diagram of an embodiment of switching waveforms;

DETAILED DESCRIPTION

Figure 1:
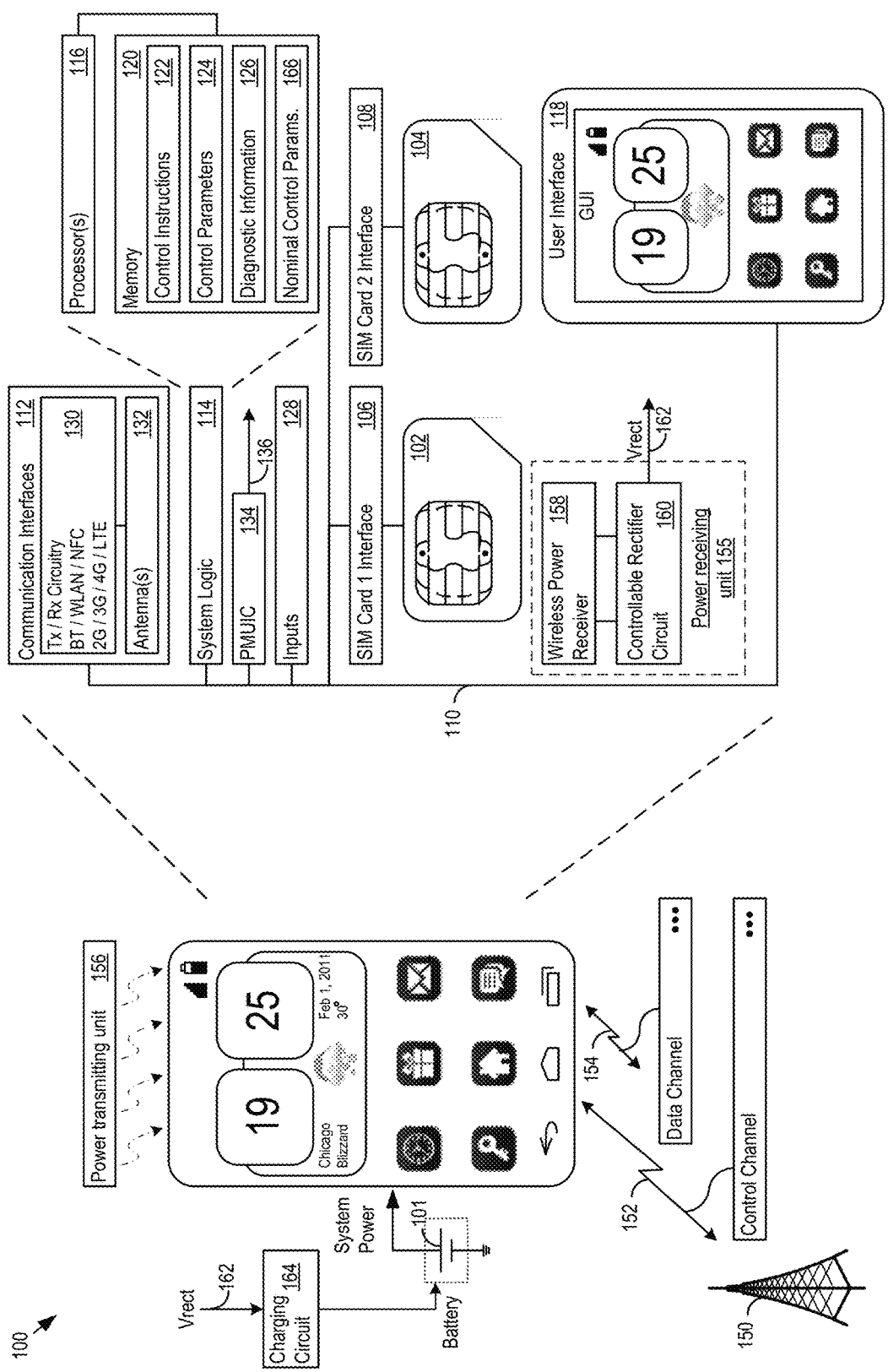
FIG. 1 is a schematic block diagram of an embodiment of a wireless communication device.

FIG. 1 is a schematic block diagram of an embodiment of a wireless communication device. A wireless communication device 100 is shown such as a 2G, 3G, or 4G/LTE smartphone capable of making and receiving wireless phone calls, and transmitting and receiving data using 802.11 a/b/g/n/ac/ad ("WiFi"), Bluetooth (BT), Near Field Communications (NFC), or any other type of wireless technology. In addition to making and receiving phone calls and transceiving data, the wireless communication device 100 optionally runs any number or type of applications. The wireless communication device 100 may draw energy from numerous different sources. As one example, the wireless communication device 100 may draw energy from the battery 101. Other sources of energy include Wireless Power Transfer (WPT) energy sources. In that respect, described further below are techniques for harvesting power from wireless signals.

The wireless communication device 100 is shown as a smartphone in this example, but the functions and features described herein can likewise be implemented in other host devices such as a laptop, tablet, cellphone, a peripheral host device such as a keyboard, a mouse, a printer, a microphone, headset, headphones, speakers or other peripheral, a driver assistance module in a vehicle or other vehicle based device, an emergency transponder, a pager, a watch including a smart watch, a satellite television receiver, a stereo receiver, music player, home appliance and/or any electronic host device that compatible with wireless charging or other wireless power transfer.

In the embodiment shown, the wireless communication device 100 communicates with a network controller 150, such as an enhanced Node B (eNB) or other base station. The network controller 150 and wireless communication device 100 establish communication channels such as the control channel 152 and the data channel 154, and exchange data. The wireless communication device 100 may be exposed to many other sources of wireless signals as well, e.g., from a wireless power transmitting unit 156, and wireless signals may be harvested in conjunction with the WPT techniques described herein.

In the embodiment shown, the wireless communication device 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The wireless communication device 100 includes communication interfaces 112, system logic 114, and a user interface 118. The system logic 114 may include any combination of hardware, software, firmware, or other logic. The system logic 114 may be implemented, for example, with one or more systems on a chip (SoC), application specific integrated circuits (ASIC), discrete analog and digital circuits, and other circuitry. The system logic 114 is part of the implementation of any desired functionality in the wireless communication device 100.

The system logic 114 may further facilitate, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 and the inputs 128 may include a graphical user interface (GUI), touch sensitive display, voice or facial recognition inputs, buttons, switches, speakers and other user interface elements. Additional examples of the inputs 128 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors and/or other sensors), and other types of inputs.

The system logic 114 may include one or more processors 116 and memories 120. The memory 120 stores, for example, control instructions 122 that the processor 116 executes to carry out desired functionality for the wireless communication device 100. The control parameters 124 provide and specify configuration and operating options for the control instructions 122. The memory 120 may also store any BT, WiFi, 3G, or other data 126 that the wireless communication device 100 will send, or has received, through the communication interfaces 112. The wireless communication device 100 may include a power management unit integrated circuit (PMUIC) 134. In a complex device like a smartphone, the PMUIC 134 may be responsible for generating, e.g., thirty (30) different power supply rails 136 for the circuitry in the wireless communication device 100.

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

As just one of many possible implementation examples, the wireless communication device 100 may include (e.g., for the communication interface 112, system logic 114, and other circuitry) a BCM59351 charging circuit, BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the wireless communication device 100, are available from Broadcom Corporation of Irvine Calif.

The power transmitting unit 156 or another power source may generate a wireless power input signal. A controllable rectifier circuit 160 receives the wireless power input signal via a wireless power receiver 158. The output of the controllable rectifier circuit 160 is the wireless power output signal 162, Vrect, that can be used by charging circuit 164 to charge a battery 101 of the wireless communication device 100 and/or to provide other system power.

In various embodiments, the controllable rectifier circuit includes a rectifier having a switching circuits configured to generate a rectified voltage, Vrect, from the wireless power signal, based on switch control signals that include a switch-on signal and a switch-off signal for each switching circuit. A rectifier control circuit generates the switch control signals based on predicted switching delays. In addition, the system logic 114 may exercise control over controllable rectifier circuit. In particular, one or more processors 116 can execute control instructions 122 to change switching prediction parameters that affect the switch timing of the controllable rectifier circuit 160. In addition, the memory 120 may also store nominal control parameters 166. The nominal control parameters 166 may set or alter switching timing for the controllable rectifier circuit 160 for pre-defined operating scenarios of the wireless communication device 100. For example, the predicted switching delays may differ in scenarios such as during startup of the wireless communication device 100, during normal operation of the wireless communication device 100, during high power or low power consumption of the wireless communication device 100 (or any other power consumption mode as determined by comparison of current power consumption against one or more power thresholds), or during any other pre-defined operating scenarios. In some implementations, the nominal control parameters 166 may be stored in a One Time Programmable (OTP) memory, with the nominal control parameters 166 determined, e.g., during a factory calibration process.

Further embodiments describing the operation of the power transmitting unit 156 and the power receiving unit 155, including numerous optional functions and features, are presented in conjunction with FIGS. 2-10 that follow.

Figure 2:
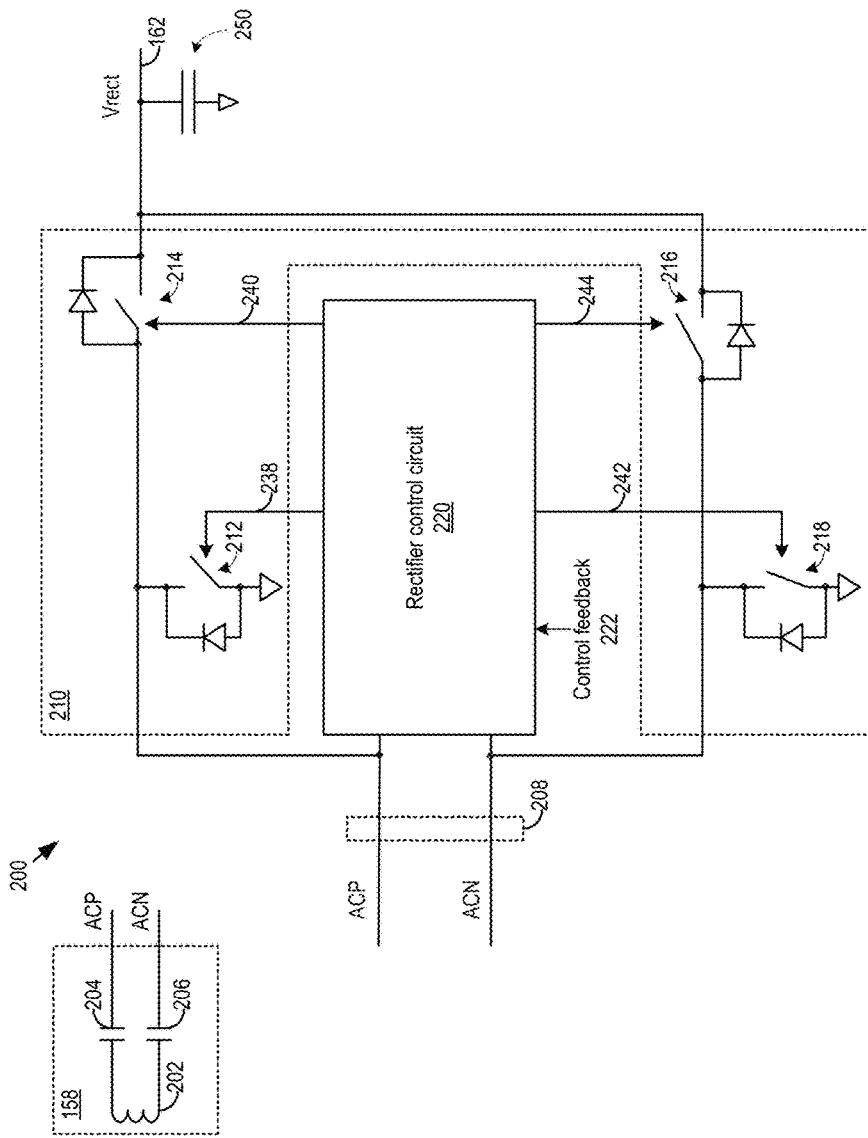
FIG. 2 is a schematic block diagram of an embodiment of components of a wireless charging system.

FIG. 2 is a schematic block diagram 200 of an embodiment of components of a wireless charging system. As just one example, the rectifier circuit 210 may harvest 6.78 MHz Alliance for Wireless Power (A4WP) power transmissions. The rectifier circuit 210 facilitates efficiency improvements in receiving the transmitted energy and delivering it (e.g., as the rectified Direct Current (DC) voltage Vrect) to subsequent energy consuming stages in the device, such as a battery charging circuit 164 for the battery 101.

Wireless power transmission suffers from efficiency losses at several stages, e.g., from converting a power source into a radio frequency (RF) wireless power signal transmission, receiving the RF flux of the wireless power signal, and converting the RF flux into a usable DC voltage in the receiving device. The wireless power receiver 158 employs magnetic resonance achieved through matching the inductance 202 and capacitance 204 and 206 to the transmitter system to obtain a high Q receiver that is very responsive to the fundamental frequency (e.g., 6.78 MHz) of the wireless power signal.

In that regard, the inductance 202 may be a coil that receives the flux of the wireless power signal. The inductance 202 may be, for example, one or more turns of a conductor on a printed circuit board, or another type of antenna. The inductance 202 produces an Alternating Current (AC) current and the capacitance 204 and 206 are tuned with respect to the inductance 202 to achieve the resonance that results in substantial responsiveness to the wireless power signal. The wireless power receiver 158 provides the AC current into the rectifier circuit 210, represented in FIG.

2 as a wireless power signal input 208 such as an AC current signal represented by AC Positive (ACP)/AC Negative (ACN).

The rectifier circuit 210 operates under control of the rectifier control circuit 220 to convert the AC current into the DC voltage, Vrect. In one implementation, the rectifier circuit 210 and rectifier control circuit 220 are integrated into an integrated circuit chip, though in other implementations discrete components may be used. The rectifier circuit 210 includes switching circuits (e.g., switching circuits 212, 214, 216, and 218) arranged to rectify the wireless power input signal to provide a wireless power output signal 162. The switching circuits 212, 214, 216, and 218 may be Metal Oxide Semiconductor FETs (MOSFETs), for example, or other types of transistors or other types of switches.

FIG. 2 shows diodes associated with each of the switching circuits 212, 214, 216, and 218 such as body diodes associated with FET implementations of these switching circuits. The body diodes may have relatively poor conductivity, such that even if the FETs turn on after the body diodes become conductive, the body diodes do not significantly affect the impedance tuning of the rectifier circuit 210. In other implementations, switches without body diodes may be used. For example a FET switching structure including cascode connected transistors may implement the switches.

Rectifier control circuit 220 controls the switching circuits 212, 214, 216, and 218 using switch control signals 238, 240, 242, and 244 to generate a wireless power output signal 162, Vrect, as a full wave rectified version of the wireless power input signal 208 that is filtered by capacitor 250 into a substantially constant DC voltage—e.g. a DC voltage with acceptable variations or ripple. The switch control signals 238, 240, 242, and 244 include a switch-on signal and a switch-off signal to individually control the ON and OFF states of each of the switching circuits to provide efficient rectification.

Traditional rectifier control circuitry that operates at high frequencies (above 1 MHz) requires the use of high bandwidth/low propagation delay comparators to sense when to turn on and off the power FETs in the H-bridge. These high bandwidth/low propagation delay comparators require high quiescent current to achieve the required specifications for bandwidth and propagation delay. This high quiescent current results in very poor low-load efficiency for the rectification stage. Poor low load efficiency is particularly problematic in mobile or wearable devices where the power loss due to the rectification overhead can become comparable to the load delivered to the system. The typical current for a comparator operating at 6.78 MHz for A4WP wireless power is on the order of 1.5 mA thus, for 4 comparators, 6 mA of quiescent current is required to sense when to turn on/off the FETs.

Further, precisely manipulating the turn on and turn off voltage for the synchronous rectifier comparators relative to the 'ideal' switching voltage can provide some level of reactive tuning for the wireless power system. In general, it is difficult to generate precise turn-on and turn-off thresholds for the high bandwidth/low propagation delay comparators without incurring speed or power penalties. In addition, High speed comparators are typically designed for zero-offset using small devices for high bandwidth. Due to process and device mismatch, the threshold can vary +/−20-30 mV. This threshold variation results in inconsistent efficiency performance from device to device.

Wireless power systems are typically designed to operate at a fixed (A4WP) or slowly varying (WPC) frequency. Thus the delay time at which each comparator turns the power FETs on and off relative to ACP and ACN crossing an arbitrary value is also fixed. Long term, as load power increases and decreases, delay timing will change but short term (over the span of several carrier clock cycles) the timing remains relatively constant. Given this consistency, the rectifier control circuit 220 can predict the switching delays and generate the switch control signals based on these predictions. In particular, high power comparators can be eliminated and replaced by a low power digital control loop that predicts the timing for turning on and off the FETs. For example this digital control loop can be designed to evaluate if the predicted timing delays are too short or too long, and make the appropriate corrections.

Figure 3:
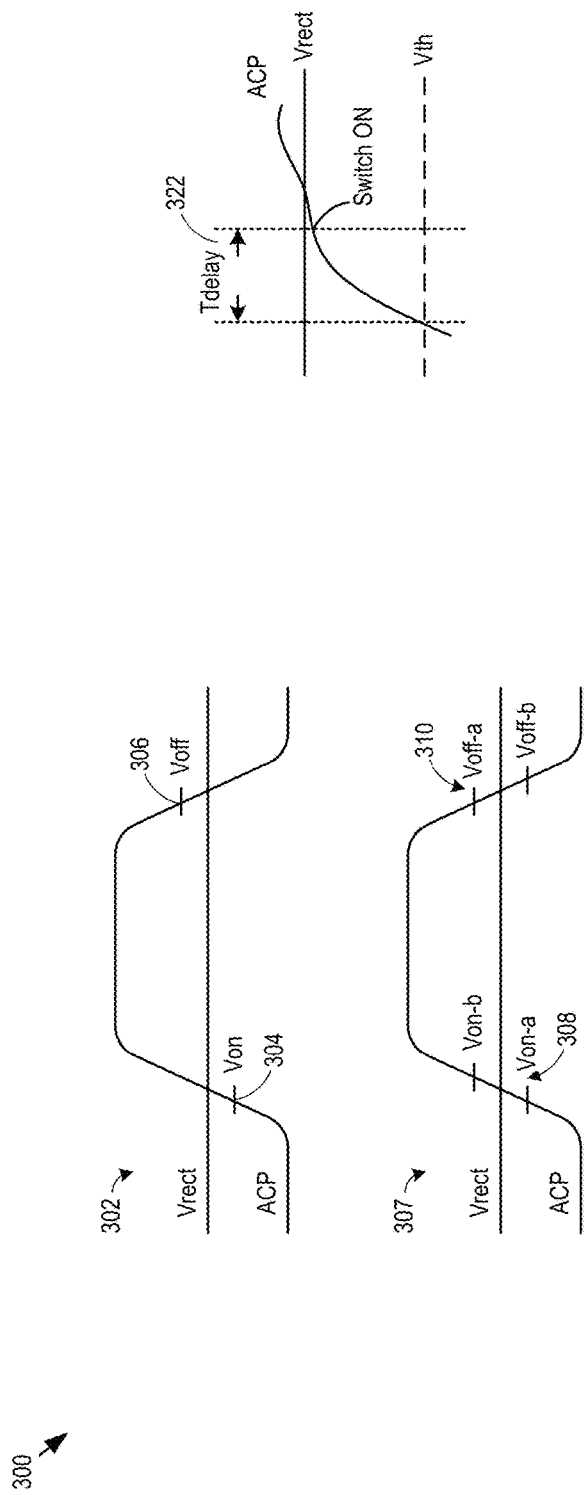
FIG. 3 is a graphical diagram of embodiments of switching waveforms.

FIG. 3 is a graphical diagram 300 of embodiments of switching waveforms. As discussed in conjunction with FIG. 2, the rectifier control circuit 220 controls the switching circuits 212, 214, 216, and 218 using switch control signals 238, 240, 242, and 244. The switching waveform 302 shows an ON threshold 304, labeled Von. As ACP rises toward Vrect, and passes the ON threshold 304, the rectifier control circuit 220 may close the switching circuits 214 and 218 to cause ACP to provide energy toward the output, Vrect. As ACP falls through the OFF threshold 306, Voff, (and ACN is rising), the rectifier control circuit 220 may close the switching circuits 212 and 216 to cause ACN to provide energy toward the output, Vrect.

In various embodiments, the rectifier control circuit 220 turns ON and OFF the switch 214 and 218 as a pair, and turn ON and OFF the switching circuits 212 and 216 as a pair. Doing so operates the rectifier circuit 200 as a full wave rectifier. Turning switching circuits ON and OFF as a pair can include turning the switching circuits ON and OFF at substantially the same time, or with comparison to substantially the same reference voltages provided by the variable voltage sources.

In other implementations, however, the switch control signals 238, 240, 242, and 244 may be set independently, and the switching circuits 212, 214, 216, and 218 may thereby turn ON and OFF at independent times. The switching waveform 307 shows an ON tuning threshold 308 that ranges between Von-a and Von-b. The switching waveform 307 also shows an OFF tuning threshold 310 that ranges between Voff-a and Voff-b.

For example, rectifier control circuit can operate based on a threshold voltage, Vth, lower than Vrect and, e.g., lower than any desired switching point. A delay circuit can be triggered at the point when ACP rises above Vth. In this way, a programmable delay time 322, Tdelay, may be implemented to set the switch turn ON time to any selected time after ACP rises above Vth. While described in conjunction with a switch turn ON time and ACP, further programmable delays can apply to a switch turn OFF time and further to switching based on ACN.

FIG. 4 is a schematic block diagram 400 of an embodiment of components of a wireless charging system. In particular, components of a power receiving unit, such as power receiving unit 155 are presented. As previously discussed, the wireless power receiver 158 is configured to receive a wireless power signal from a power transmitting unit. A controllable rectifier circuit 160 is configured to rectify the wireless power signal. The controllable rectifier circuit 160 includes a rectifier circuit 210 that includes a plurality of switching circuits configured to generate a rectified voltage, Vrect, from the wireless power signal, based on switch control signals 238, 240, 242 and 244 that include a switch-on signal and a switch-off signal for corresponding ones of the plurality of switching circuits. The rectifier control circuit 220 is configured to generate the switch control signals 238, 240, 242 and 244 based on a prediction of switching delays.

In the embodiment shown, control feedback 222 is generated by feedback generator 402 to aid the rectifier control circuit 220 in the prediction of switching delays used in generating the switch control signals 238, 240, 242 and 244. The feedback generator 402 can be implemented via a processor 116 or other system logic 114. While shown as being separate from rectifier circuit 220, the functionality of rectifier control circuit 220 can nevertheless be combined into a single circuit, processor or other logic.

In various embodiments, while the rectifier control circuit 220 can itself predict switching delays, the control feedback 222 can include desired voltage thresholds, initial switching delays, nominal control parameters 166 and/or other prediction parameters that initialize and/or adapt the rectifier control circuit 220 to start-up conditions and other pre-defined operating scenarios of the host device and/or provide other feedback to optimize or otherwise improve the performance of the rectifier control circuit 220 in the prediction of switching delays used in generating the switch control signals 238, 240, 242 and 244. For example, different switching timing may apply to startup of the wireless communication device 100, during normal operation of the wireless communication device 100, during high power or low power consumption of the wireless communication device 100 (or any other power consumption mode as determined by comparison of current power consumption against one or more power thresholds), or during any other pre-defined operating scenarios. In some implementations, the nominal control parameters 166 may be stored in a One Time Programmable (OTP) memory, with the nominal control parameters 166 determined, e.g., during a factory calibration process.

In addition, the control feedback 222 can include adjustments to voltage thresholds, switching delays and/or nominal control parameters 166 that are generated based on feedback generated based on sampling the switching waveforms 406 of one or more of the switching circuits. In this fashion, a voltage threshold used to trigger a timing delay that sets a switch ON or switch OFF signal can be generated based on a measured overshoot and/or a measured undershoot of the corresponding one of the switching waveforms 406. In addition, samples of the alternating current draw by the wireless power receiver can be used to minimize current draw or otherwise to optimize power factor, providing more efficient power transfer. Further, sampling of current draw and/or the rectified voltage over a plurality of cycles of the wireless power signal can be further used to adjust voltage thresholds used in the prediction of switching delays to compensate for current conditions in generating the switch control signals 238, 240, 242 and 244.

For example, the feedback generator 402 can analyze the AC current signal ACP/ACN and generate control feedback 222 that is used to predict the timing delays of the switching circuits 212, 214, 216 and 218. More particularly, the feedback generator 402 provide control feedback 222 to the rectifier control circuit 220 to generate switch control signals 238, 240, 242 and 244 for efficient power transfer or other optimization goal. In that regard, the feedback generator 402 can measure and generate control feedback 222 in an attempt to reduce any phase shift present between the AC current signal ACP/ACN and the ACP/ACN voltage. The control feedback 222 may provide control adjustments over time scales on the order of nanoseconds to microseconds, for instance, though finer and coarser timing adjustments may also be made.

In another example, wireless communication device 100 can receive a message specifying transmit power 404 (Ptx) over a communication interface (e.g., a Bluetooth interface or other control signaling) between the wireless communication device 100 and the power transmitting unit 156. The power receiving unit 155 can include a dedicated Bluetooth low energy (BLE) interface, communicate with the power transmitting unit 156 via load modulation or utilize one or more other communication interfaces of the wireless communication device 100 to provide such a control channel. The feedback generator 402 can measure the received power (Prx), and compare the received power with the transmitted power (Ptx). The feedback generator 402 can then search, e.g., by adjusting control feedback 222 and measuring the resulting effect on Prx, in an attempt to improve the timing delay predictions to maximize (as one possible operational goal) the quantity Prx/Ptx.

In a further example, switching ON late (e.g., after ACP exceeds Vrect) allows ACP to rise faster. When the switching circuits turn ON, ACP is shorted through the switching circuits to Vrect. On the other hand, switching early (e.g. before ACP reaches Vrect) connects the higher voltage Vrect to ACP, and tends to slow the rise of ACP. Accordingly, the feedback generator 402 can adjust control feedback 222 to vary switch timing predictions that affect when the switching circuits 212, 214, 216 and 218 turn ON and OFF—impacting how fast ACP rises relative to current actually flowing into Vrect. In this way, the feedback generator 402 can implement changes in the current and voltage phase relationship in an attempt to increase efficiency by keeping current in-phase with voltage.

The feedback generator 402 can, as examples, implement open loop control, closed loop control, or a combination of both. With open loop control, the feedback generator 402 can, for instance, monitor the load, determine how much to change the switch timing, and implement that change. With closed loop control, for instance, the feedback generator 402 can dither around the complex impedance that helps achieve the current operational goal, e.g., for maximum power transfer tuning the rectifier circuit 210 so that Vrect is maximized. The closed loop control may thereby track to the complex impedance that best meets the operational goal.

FIG. 5 is a graphical diagram 500 of an embodiment of switching waveforms. As discussed in conjunction with FIG. 4, the control feedback 222 can include adjustments to voltage thresholds, switching delays and/or nominal control parameters 166 that are generated based on feedback generated based on sampling the switching waveform of one or more of the switching circuits. In this fashion, a voltage threshold used to trigger a timing delay that sets a switch ON or switch OFF signal can be generated based a measured overshoot and/or a measured undershoot of a corresponding one of the switching waveforms 406.

In particular, a desired response 542 of a switching waveform generated by one of the switching circuits 212, 214, 216 or 218 is shown. Switching late can yield a switching waveform with overshoot 544—indicating body diode conduction. In particular, switching too late causes body diode conduction which results in power dissipated in the diode instead of the load reducing efficiency. Conversely, switching early can generate a switching waveform with undershoot 546—indicating reverse current flow. In particular, switching too early results in current flowing from VRECT into the coil. This reverse current reduces efficiency as it requires the transmitter to overcome this reverse current before delivering charge into VRECT.

In various embodiments, the feedback generator 402 can sample the switching waveform and measure the actual response curve to determine the amount of undershoot and/or overshoot. In response, the feedback generator can generate control feedback 222 to modify the switching delay predictions, increasing the timing delay in the event of overshoot, and reducing the timing delay in the event of undershoot, in an attempt to generate a switching waveform with a desired response 542. While the undershoot and overshoot are shown in conjunction with the leading edge of the switching waveform, similar artifacts (not specifically shown) can occur on the trailing edge of the switching waveform. Because the overshoot and undershoot occur in conjunction with the leading edge and trailing edge of the switching waveform, samples of the switching waveforms can be limited to one or both of these regions.

Figure 6:
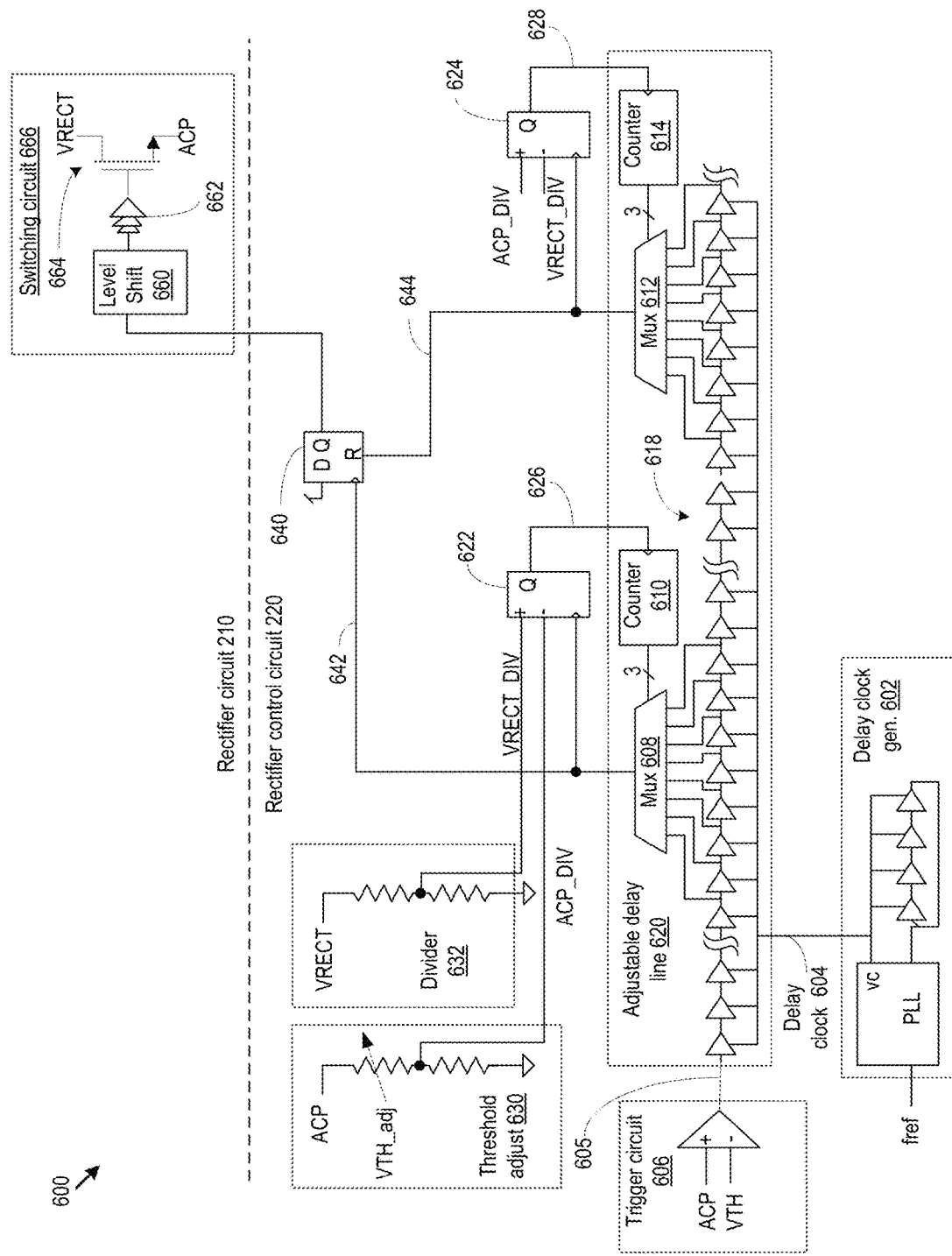
FIG. 6 is a schematic block diagram of an embodiment of components of a rectifier control circuit and a rectifier circuit.

FIG. 6 is a schematic block diagram 600 of an embodiment of components of a rectifier control circuit and a rectifier circuit. In particular components of rectifier control circuit 220 and rectifier circuit 210 are shown for a single switching circuit 666 that operates via ACP. The other ACP switching circuit and the two ACN switching circuits can likewise be implemented in a similar fashion. In the embodiment shown, the boundary between components of the rectifier circuit 210 and the rectifier control circuit 220 is indicated by a dashed line.

The rectifier control circuit 220 includes a trigger circuit 606 configured to generate a trigger signal 605 that indicates a point in time that the wireless power signal ACP crosses a first voltage threshold (VTH). An adjustable delay line 620 includes a tapped delay line 618, multiplexers 608 and 612 and counters 610 and 614. The tapped delay line 618 is clocked by delay clock generator 602 that includes a phase locked loop (PLL) and a string of delay elements. In an embodiment, the PLL operates on a 250 MHz reference frequency fref, so as to generate a delay control voltage 604 that sets replica 1 nsec delay elements in delay lines 620 and 618—while consuming only a few uA of current. The adjustable delay line 620 is configured to generate the switch-on signal 642 and switch-off signal 644 for the switching circuits based on predicted switching delays. The threshold VTH can be nominally set at some value between VRECT and GND—a value low enough to insure that the adjustable delay line is triggered prior to any possible switching point.

In operation, the trigger signal 605 initiates timing by the adjustable delay line 620. The trigger signal 605 propagates down the tapped delay line 618 at 1 nsec intervals. The multiplexers 608 and 612 operate under control of the up-down counters 610 and 614 to select the particular timing delays (Tdelay) for the switch-on signal 642 and switch off signal 644. These timing delays are predicted from the last cycle based on the clocked comparators 622 and 624. The clocked comparators 622 and 624 each include a sample and hold circuit to hold the comparison from the last cycle for use in timing of the next cycle. The clocked comparator 622 is clocked by the switch-on signal 642 to compare the divided rectifier signal (Vrect_DIV) generated by divider 632 to a divided version of ACP (ACP_DIV) as adjusted by second voltage threshold (VTH_adj) set by threshold adjust 630 to generate a clocked comparison 626. In particular, before the FET turns on, the clocked comparator 622 is used to determine if ACP is above or below VRECT (as adjusted by VTH_adj). This comparison is used to increment or decrement the counter 610 which adjusts the predicted switching delay by advancing or retarding the tap of the tapped delay line 618 selected by the multiplexer 608. In particular, the tap can be advanced if the clocked comparison 626 indicates that the switch on timing is late and the tap can be advanced if the clocked comparison 626 indicates that the switch on timing is early. As previously discussed, control feedback 222 can be used to set the value of VTH_adj, to provide further upward or downward adjustment to the prediction based on other factors.

In a similar fashion, the clocked comparator 624 is clocked by the switch-off signal 644 to compare the divided rectifier signal (Vrect_DIV) generated by divider 632 to a divided version of ACP (ACP_DIV) as adjusted by second voltage threshold (VTH_adj) set by threshold adjust 630 to generate a clocked comparison 628. In particular, before the FET turns off, the clocked comparator 624 is used to determine if ACP is above or below VRECT (as adjusted by VTH_adj). This comparison is used to increment or decrement the counter 614 which adjusts the predicted switching delay by advancing or retarding the tap of the tapped delay line 618 selected by the multiplexer 612. In particular, the tap can be advanced if the clocked comparison 628 indicates that the switch off timing is late and the tap can be advanced if the clocked comparison 628 indicates that the switch off timing is early. As previously discussed, control feedback 222 can be used to set the value of VTH_adj, to provide further upward or downward adjustment to the prediction based on other factors. It should be noted that while a single value VTH_adj, is shown as being used in the control of both the switch-on signal 642 and the switch-off signal 644, separate values indicated by control feedback 222 could be used for this purpose.

In various embodiments, the components of the rectifier circuit 210 are implemented in a 24V domain while the components of the rectifier control circuit 220 are implemented in a 1.5V domain, however, other voltage domains could likewise be implemented. The switch-on signal 642 and switch-off signal 644 are fed to D flip-flop 640. The output of the flip-flop 640 is level shifted to the 24V domain via level shift 660, and used by current driver 662 to switch on and off the FET 664.

This architecture eliminates the high current comparators that could consume 6 mA of quiescent current. In its place are the digital replica cells in a tapped delay line, a PLL, and mux circuits which can operate on the 1.5V core supply. The decision comparators can use a sample and hold front end and would have the entire 6.78 MHz cycle to make a decision so they can be designed for very low current as well. The entire system can operate on the core 1.5V supply and consume, for example, only a few hundred uA of quiescent current.

This architecture also addresses the difficulty in generating precise turn-on and turn-off thresholds because it allows (via the dividers) a method of adjusting the setpoint for the comparator to trip. In addition, this implementation also addresses the problem of part-to-part variations. The clocked comparators 622 and 624 have the entire 6.78 MHz switching cycle to make a decision. This allows the use of a low bandwidth front end that uses large devices for low offset thus suppressing the part-to part variation. The architecture described herein can be implemented in a smaller area with reduced current consumption compared with traditional designs. This architecture also improves low-load rectification efficiency due to the reduced quiescent current and allows for finer adjustment of rectifier FET switching thresholds for reactive tuning and higher power transfer efficiency, faster charge times and higher charging before reaching a thermal limit.

Figure 7:
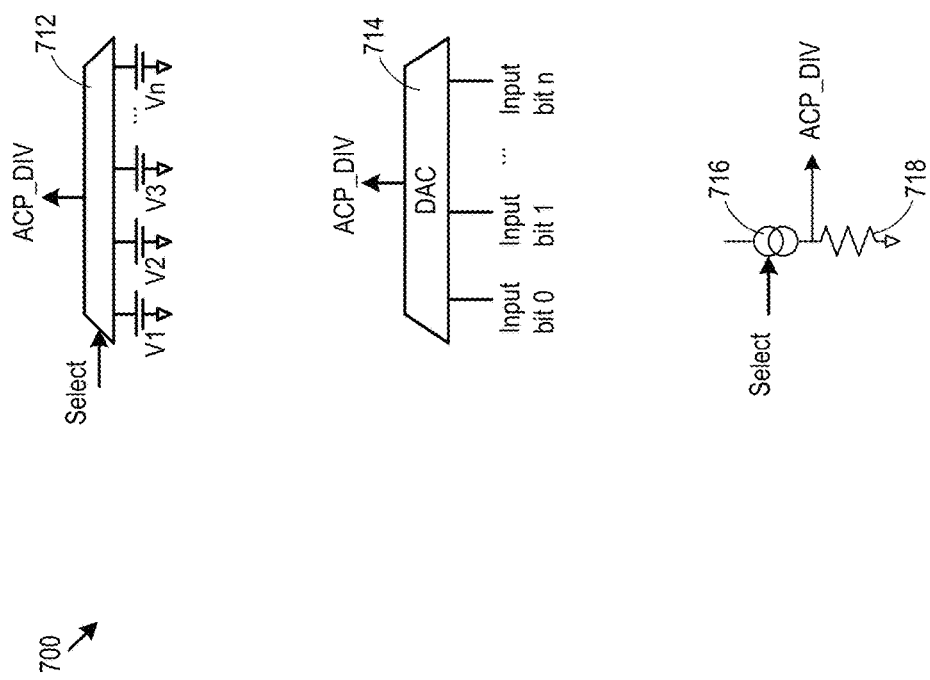
FIG. 7 is schematic block diagrams of embodiments of adjustable voltage generators.

FIG. 7 is schematic block diagrams 700 of embodiments of adjustable voltage generators. In particular, several alternatives for the threshold adjust 630 are shown. For example, an analog multiplexer 712, responsive to a voltage selection input such as VTH_adj, may perform adjustment of ACP_DIV. As another example, the control logic may provide a digital control bits (as a voltage selection input such as VTH_adj) to a Digital to Analog Converter (DAC) 714. The DAC 714 may then generate multiple different voltages, as chosen by the control logic. As yet another example, the control logic may adjust a programmable current source 716 using a voltage selection input such as VTH_adj to increase or decrease current flowing through a reference resistor 718. The increase or decrease in current results in a change in the variable voltage provided to the rectifier control circuit 220.

Figure 8:
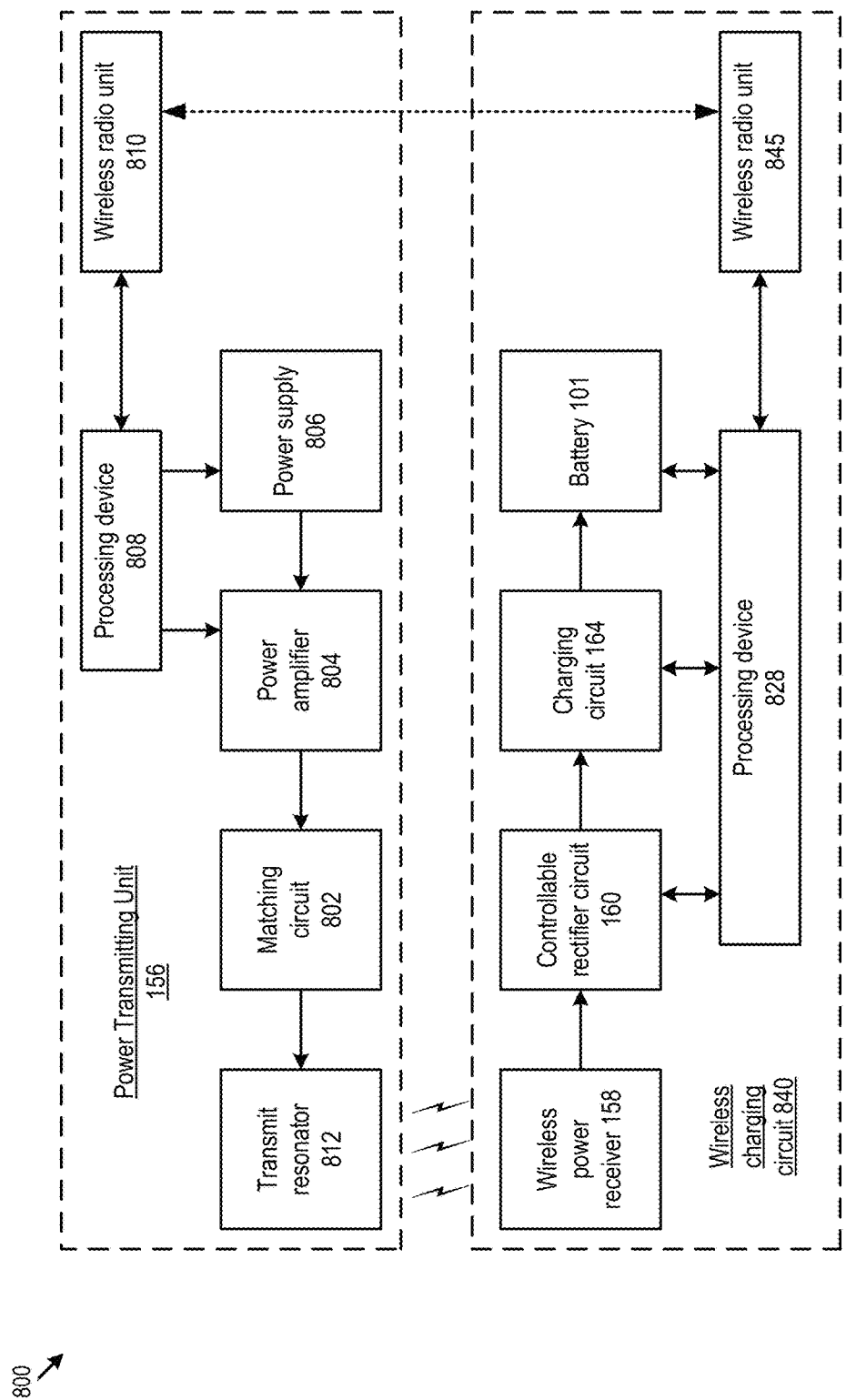
FIG. 8 is a schematic block diagram of an embodiment of a power transmitting unit and a wireless charging circuit.

FIG. 8 is a schematic block diagram 800 of an embodiment of a power transmitting unit and a power receiving unit. In particular, PTU 156 includes a transmit resonator 812, matching circuit 802, power amplifier 804 power supply 806, processing device 808 and wireless radio unit (WRU) 810. Wireless charging circuit 840 includes a wireless power receiver 158, a controllable rectifier circuit 160, a charging circuit 164, a battery 101 and a processing device 828 that can include the operation of feedback generator 402 and provide further control of the charging circuit 164 for charging the battery 101. In addition, wireless charging circuit 840 includes a WRU 845 that communicates with the WRU 810 for providing a control channel with the PTU 156.

In operation, the wireless charging circuit 840 receives a wireless power signal from PTU 156 to charge the battery 101 under control of the processing device 828. The WRU 845 also operates under control of the processing device 828 to establish a wireless connection with the WRU 810 of PTU 156 via a connection establishment procedure. The WRU 845 exchanges control data with the power transmitting unit 156 via the wireless connection to establish a charging session and/or to share other control data and signaling. Processing device 808 controls the operation of power supply 806 and power amplifier 804 to generate an RF power signal. The matching circuit 802 couples the RF power signal to the transmit resonator 812 for transmission. The RF power signal is received by the wireless power receiver 158, rectified by controllable rectifier circuit 160 and converted into a DC charging signal by charging circuit 164 for charging of the battery 101. Processing device 828 monitors and controls the charging to, for example, provide the functionality of feedback generator 402, avoid over-voltage and under-voltage conditions, high temperature events, and/or other detrimental conditions.

The WRU 845 can receive a message specifying transmit power 404 (Ptx) from the WRU 845 of the power transmitting unit 156. The processing device 828 can measure the received power (Prx), and compare the received power with the transmitted power (Ptx). The processing device 828 can then search, e.g., by adjusting control feedback 222 and measuring the resulting affect on Prx, in an attempt to maximize (as one possible operational goal) the quantity Prx/Ptx.

The control channel between the WRU 845 and WRU 810 can be used to exchange other control data as well that can be used to increase device efficiency, power transfer and support other functions. In particular, the control channel can be used to communicate control data with the power transmitting unit such as a battery status indication, a battery voltage, a voltage delta, a load condition, or a predicted change in load conditions. The power transmitting unit 156 can adjust a parameter of the transmitted wireless power signal in response to the control data. The wireless charging circuit 840 can similarly receive control data from the power transmitting unit 156 such as a voltage limit, a current limit, a power limit, a transient behavior parameter, a timing parameter, etc. The wireless charging circuit 840 can adjust a load or charging parameter in response to the control data.

Too high a voltage delta between Vrect and the voltage of battery 101 can waste power. The processing device 828 can sample the actual voltage of battery 101 and/or the voltage delta at the wireless charging circuit 840 and the control channel can be used to provide control data to the PTU 156 that indicates the actual battery voltage and/or the voltage data. This allows the PTU 156 to operate via processing device 808 to control the transmit power to maintain an optimal voltage delta. In particular, the processor 808 of the PTU 156 can step-up or step down its output power via control of power supply 806 and/or power amplifier 804 to react to changes in power needs and/or reduce the chance of over-voltage or under-voltage conditions.

In a further example, control data from wireless charging circuit 840 regarding the current loading and device state can be used to set a desired voltage delta and/or a desired power output. When the wireless charging circuit 840 is merely charging a lithium ion battery of the device at 3.3 volts, a small voltage delta of approximately 0.3 volts may be sufficient—with a desired Vrect of 3.6 volts. If however, an application processor is running higher current from a 5 volt power rail, a higher voltage delta of approximately 1.0 volts may be needed—with a desired Vrect of 6 volts. Again, the processor 808 of the PTU 156 can step-up or step down its output power via control of power supply 806 and/or power amplifier 804 to react to changes in power needs and/or reduce the chance of over-voltage or under-voltage conditions.

In addition or in the alternative, the particular battery state can be shared via the control channel between the WRU 845 and WRU 810. In this fashion, the processor 808 of the PTU 156 can adjust its output power via control of power supply 806 and/or power amplifier 804 based on whether the battery is currently in standby mode, constant voltage mode or constant current mode.

In addition to sharing information on current conditions, the processing device 828 can generate predicted load line data that is shared with the PTU 156 in order to maximize power transfer. For example, the processing device 828 can monitor device state and activities and alert the PTU 156 when its load is about to increase due to a planned increase in processor speed of the host device, a plan to transmit by the host device, a plan to turn on additional devices, and/or a decrease in load due to a suspension of any of these activities. The step response of the PTU 156 to changes in output power level may not be instantaneous and consequently have an associated delay until the transmit power settles on a desired steady state level. In response this information from the wireless charging circuit 840, the processor 808 of the PTU 156 can begin to step-up or step down its output power via control of power supply 806 and/or power amplifier 804 to anticipate changes in power needs, reducing the chance of over-voltage or under-voltage conditions and being better able to confirm to changes in steady state power demands from the wireless charging circuit 840.

In yet another example, the processing device 828 operates to control its loading/current usage, based on transmitter characteristics and power transfer either provided via the control channel from the PTU 156 or based on measurements of received power via the processing device. For example, the PTU 156 can share voltage, current or other power limits, transient behavior parameters, timing information, etc. For example, the processing device 828 can operate to limit loading in cases of power delivery transients, determine a level of steady state power surplus and allocate that power surplus charging. In a similar fashion, the processing device 828 can provide input to the host device to regulate the consumed power to maintain a predetermined rate of battery charging or otherwise to maintain the rate of battery charging below the rate of power being received by the wireless charging circuit 840.

While the foregoing has described the implementation of a control channel between the PTU 156 and the wireless charging circuit 840 that operates via WRUs 810 and 845, other control channels implemented via load modulation or alternative wireless links can likewise be implemented.

Figure 9:
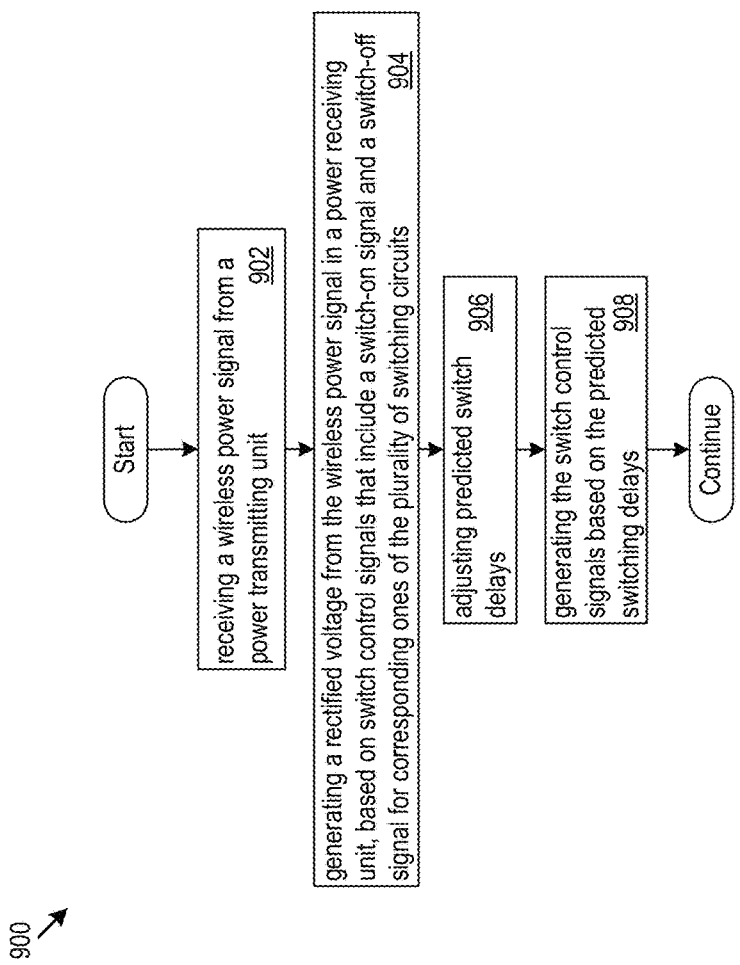
FIG. 9 is a flowchart representation of an embodiment of a method.

FIG. 9 is a flowchart representation 900 of an embodiment of a method. In particular, a method is presented for use with one or more functions and features described in conjunction with FIGS. 1-8. Step 902 includes receiving a wireless power signal from a power transmitting unit. Step 904 includes generating a rectified voltage from the wireless power signal in a power receiving unit, based on switch control signals that include a switch-on signal and a switch-off signal for corresponding ones of the plurality of switching circuits. Step 906 includes adjusting predicted switch delays. Step 908 includes generating the switch control signals based on the predicted switching delays.

Figure 10:
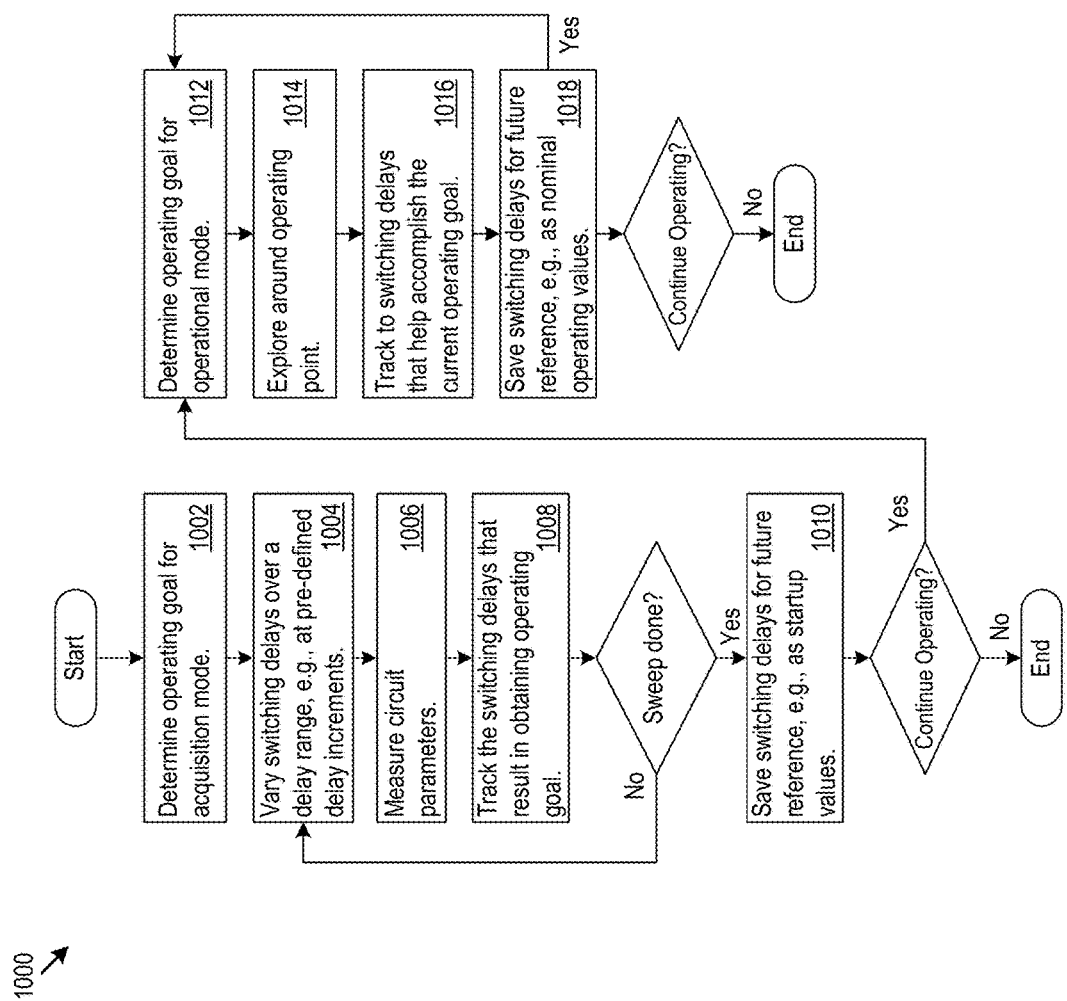
FIG. 10 is a flowchart representation of an embodiment of a method.

FIG. 10 is a flowchart representation 1000 of an embodiment of a method. In an acquisition mode of operation, the system logic 114, via processing device 828 or circuit or device may determine an acquisition operating goal (step 1002), as examples maximum power transfer, power factor, undershoot, overshoot, or power transfer to Vrect above a pre-determined threshold amount, etc. In acquisition mode, the system logic 114 may sweep switching delays, e.g., over a pre-define delay range at, e.g., pre-defined delay increments for any particular switch or combination of switches in the controllable rectifier circuit 160 (step 1004). At each set of switching delays presently implemented, the system logic 114 may measure circuit parameters for a given length of time (step 1006), e.g., a specified number of clock cycles, or a specified duration. Examples of circuit parameters include the current and voltage phase of ACP/ACN, the magnitude of Vrect, the complex impedance presented by the switching circuit, and other parameters that bear upon the current operating goal. The system logic 114 thereby locates the switching delays that help achieve the current operating goal (step 1008) as informed by the measured circuit parameters. For instance, for maximizing power transfer, the sweep may find the switching delay for each switch over the measurement period at which Vrect is largest, overshoot and overshoot are lowest, current draw is lowest, on average. The switching delays that achieve the acquisition operating goal may be saved, e.g., in the memory 120, for use as a subsequent starting point, or for any other future use as, for example nominal control parameters 166 (step 1010).

After acquisition mode, the system logic 114 may transition to an operational mode that has the same or different operational goal as acquisition mode (step 1012). The current operating goal may change at any time. In operational mode, the system logic 114 may, during operation of the controllable rectifier circuit 160, explore around the current operating point (e.g., by dithering around previously set switching delays via adjustments to control feedback 222) (step 1014). The exploration may facilitate tracking to the switching delays that help accomplish the current operating goal, e.g., as the load changes (step 1016). The control feedback 222 that help accomplish any particular operating goal may be saved for future reference, e.g., in the memory 120 (step 1018). There may be a library of control feedback 222 established in the device for use in predicting switching delays to implement for any particular operating goal.

In one implementation, the exploration may start with control feedback 222 that yield switching delays at one extreme, e.g., the shortest switching delays. The exploration may then increase the delays and walk up the result curve for the current operating goal (e.g., maximum power transfer), until the set of parameters is reached where the result begins to fall off. That set of parameters may become the current operating point. The exploration may then search around the current operating point to facilitate tracking toward the current operating goal in the face of, e.g., load or other changes.

As noted above, in some implementations, when the host device is a predetermined operating mode, e.g., starting up, booting, or is another predetermined a state, the system logic may set the switching delays to a startup set of delays. The startup set of delays may be obtained from the nominal tuning parameters 166 in the memory 120, or form other source (e.g., the PTU 156 over a communication like, such as a Bluetooth link). Typically, prior to nominal operation, power consumption is much lower, and the switching delays that provide a desired amount of power transfer via Vrect are more broadband in nature in that a wider range of delays will obtain the desired power transfer. As a result, the host device may receive sufficient power during bootup to provide power for subsequent system operation, and perform tracking to help meet the current operational goal, e.g., maximum power transfer.

As power consumption increases, the load increases, and the load on the wireless power receiver 158 increases. The impedance of the load will have significant effects on power transfer and efficiency. According, the system logic 114 may measure circuit parameters such as switching waveform voltages, current draw and/or other parameters during operation in order to dynamically tune the control feedback to yield switching delays that continue to track the current desired operational goal.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Various embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

A physical embodiment of an apparatus, an article of manufacture, a machine, and/or of a process that includes one or more embodiments may include one or more of the aspects, features, concepts, examples, etc. described with herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various options, methods, functions and features have been expressly described herein, other combinations of these options, methods, functions and features are likewise possible. The various embodiments are not limited by the particular examples disclosed herein and expressly incorporates these other combinations.

What is claimed is:

1. A power receiving unit comprising:
   a wireless power receiver configured to receive a wireless power signal from a power transmitting unit; and
   a controllable rectifier circuit configured to rectify the wireless power signal, the controllable rectifier circuit comprising:
   a rectifier that includes a plurality of switching circuits configured to generate a rectified voltage from the wireless power signal, based on switch control signals that include a switch-on signal and a switch-off signal for corresponding ones of the plurality of switching circuits; and
   a rectifier control circuit configured to generate the switch control signals based on predicted switching delays.

2. The power receiving unit of claim 1 wherein the rectifier control circuit includes:
   an adjustable delay line configured to generate the switch-on signal for one of the plurality of switching circuits based on a first predicted switching delay of the predicted switching delays.

3. The power receiving unit of claim 2 wherein the rectifier control circuit further includes:
   a trigger circuit configured to generate a trigger signal that indicates on a point in time that the wireless power signal crosses a first voltage threshold;
   wherein the trigger signal initiates timing by the adjustable delay line.

4. The power receiving unit of claim 3 wherein the rectifier control circuit further includes:
   a first clocked comparator, clocked by the switch-on signal, configured to compare a divided rectifier signal to a second voltage threshold to generate a first clocked comparison;
   wherein the adjustable delay line includes a first counter configured to adjust the first predicted switching delay in response to the first clocked comparison.

5. The power receiving unit of claim 4 wherein adjustable delay line is further configured to generate the switch-off signal for the one of the plurality of switching circuits based on a second adjustable delay of the predicted switching delays.

6. The power receiving unit of claim 5 wherein the rectifier control circuit further includes:
a second clocked comparator, clocked by the switch-on signal, configured to compare the divided rectifier signal to the second voltage threshold to generate a second clocked comparison;
wherein the adjustable delay line includes a second counter configured to adjust the second predicted switching delay in response to the first clocked comparison.

7. The power receiving unit of claim 4 wherein the second voltage threshold is generated based on at least one of: a measured overshoot of a switching waveform or a measured undershoot of the switching waveform.

8. The power receiving unit of claim 4 wherein the second voltage threshold is generated based on an analysis a plurality of cycles of the wireless power signal.

9. The power receiving unit of claim 4 wherein the second voltage threshold is generated based on an analysis of alternating current draw by the wireless power receiver.

10. A method comprising:
receiving a wireless power signal from a power transmitting unit;
generating a rectified voltage from the wireless power signal in a power receiving unit, based on switch control signals that include a switch-on signal and a switch-off signal for corresponding ones of the plurality of switching circuits;
adjusting predicted switch delays; and
generating the switch control signals based on the predicted switching delays.

11. A wireless communication device comprising:
a wireless power receiver configured to receive a wireless power signal from a power transmitting unit;
a controllable rectifier circuit configured to rectify the wireless power signal, the controllable rectifier circuit comprising:
a rectifier that includes a plurality of switching circuits configured to generate a rectified voltage from the wireless power signal, based on switch control signals that include a switch-on signal and a switch-off signal for corresponding ones of the plurality of switching circuits; and
a rectifier control circuit configured to generate the switch control signals based on predicted switching delays; and
a charging circuit configured to charge a battery of the wireless communication device based on the rectified voltage.

12. The wireless communication device of claim 11 wherein the rectifier control circuit includes:
an adjustable delay line configured to generate the switch-on signal for one of the plurality of switching circuits based on a first predicted switching delay of the predicted switching delays.

13. The wireless communication device of claim 12 wherein the rectifier control circuit further includes:
a trigger circuit configured to generate a trigger signal that indicates on a point in time that the wireless power signal crosses a first voltage threshold;
wherein the trigger signal initiates timing by the adjustable delay line.

14. The wireless communication device of claim 13 wherein the rectifier control circuit further includes:
a first clocked comparator, clocked by the switch-on signal, configured to compare a divided rectifier signal to a second voltage threshold to generate a first clocked comparison;
wherein the adjustable delay line includes a first counter configured to adjust the first predicted switching delay in response to the first clocked comparison.

15. The wireless communication device of claim 14 wherein adjustable delay line is further configured to generate the switch-off signal for the one of the plurality of switching circuits based on a second adjustable delay of the predicted switching delays.

16. The wireless communication device of claim 15 wherein the rectifier control circuit further includes:
a second clocked comparator, clocked by the switch-on signal, configured to compare the divided rectifier signal to the second voltage threshold to generate a second clocked comparison;
wherein the adjustable delay line includes a second counter configured to adjust the second predicted switching delay in response to the first clocked comparison.

17. The wireless communication device of claim 14 wherein the second voltage threshold is generated based on at least one of: a measured overshoot of a switching waveform or a measured undershoot of the switching waveform.

18. The wireless communication device of claim 14 wherein the second voltage threshold is generated based on an analysis a plurality of cycles of the wireless power signal.

19. The wireless communication device of claim 14 further comprising a wireless radio unit for communicating control data with the power transmitting unit wherein the control data includes at least one of: a battery status indication, a battery voltage, a voltage delta, a load condition, or a predicted change in load conditions, and wherein the power transmitting unit adjusts a parameter of the wireless power signal in response to the control data.

20. The wireless communication device of claim 12 further comprising a wireless radio unit for receiving control data from the power transmitting unit wherein the control data includes at least one of: a voltage limit, a current limit, a power limit, a transient behavior parameter, or a timing parameter;
wherein charging circuit adjusts a charging parameter in response to the control data.

* * * * *